United States Patent
Heidl et al.

[11] Patent Number: 5,249,637
[45] Date of Patent: Oct. 5, 1993

[54] HYBRID VEHICLE

[75] Inventors: Roland Heidl, Lenting; Franz Hasler, Wettstetten, both of Fed. Rep. of Germany

[73] Assignee: Audi AG, Ingolstadt, Fed. Rep. of Germany

[21] Appl. No.: 852,213

[22] PCT Filed: Nov. 30, 1990

[86] PCT No.: PCT/EP90/02059
§ 371 Date: May 29, 1992
§ 102(e) Date: May 29, 1992

[87] PCT Pub. No.: WO91/08123
PCT Pub. Date: Jun. 13, 1991

[30] Foreign Application Priority Data
Dec. 5, 1989 [DE] Fed. Rep. of Germany ....... 3940172

[51] Int. Cl.[5] .................................................. B60K 1/00
[52] U.S. Cl. ................................ 180/65.2; 180/65.4; 180/53.8
[58] Field of Search ............... 180/65.1, 65.2, 65.3, 180/65.4, 165, 53.5, 53.7, 53.8

[56] References Cited
U.S. PATENT DOCUMENTS
4,042,056 8/1977 Horwinski ........................ 180/65.2
4,180,138 12/1979 Shea ................................. 180/65.2

FOREIGN PATENT DOCUMENTS
0246353 11/1987 European Pat. Off. .
0334672 9/1989 European Pat. Off. .
178513 2/1906 Fed. Rep. of Germany .
2309680 5/1974 Fed. Rep. of Germany .
2501386 7/1976 Fed. Rep. of Germany .
2929497 2/1981 Fed. Rep. of Germany .
3009503 9/1981 Fed. Rep. of Germany .
58-116229 7/1983 Japan .
58-118424 7/1983 Japan .
1270764 4/1972 United Kingdom .

Primary Examiner—Richard M. Camby
Attorney, Agent, or Firm—Lalos & Keegan

[57] ABSTRACT

A hybrid-propulsion vehicle, having one axle driven by an internal-combustion engine while the other is driven by a first electric motor. A second electric motor mounted in the vicinity of the internal-combustion engine acts as a servo motor, operating a servo pump when the vehicle is running on electric drive. When the vehicle is running via the internal-combustion engine, the servo motor acts as a generator for recharging the battery supply for the first electric motor.

3 Claims, 5 Drawing Sheets

HYBRID VEHICLE

The invention relates to a hybrid vehicle and, more particularly, to a hybrid vehicle with both an internal combustion engine and an electric motor for propulsion.

A vehicle of this type is known from DE-A 30 09 503. The hybrid vehicle described there that is operated either with a main motor designed as an electric motor, or with an auxiliary drive motor designed as an internal combustion engine, also has a second electric motor for the auxiliary units; it is connected via a first pulley to the main electric motor and via a second pulley to an internal combustion engine. The second electric motor guarantees the minimum power for the auxiliary units. However the power is delivered under normal conditions from the main electric motor or the internal combustion engine.

Other hybrid vehicles are known from DE-A 29 29 497 or EP-A 0 004 104. These hybrid autos have, in addition to the internal combustion engine, an electric motor, for which either the electric motor can be connected when better traction is desired and thus all wheel drive is produced as a starting aid, or a switch is made to exclusively electric drive when operation with the internal combustion engine is not desired, for example, for reasons of exhaust. The noise level is also greatly reduced when operating with the electric motor.

Furthermore, it is also known from DE-A 23 09 680 that the accessory drives for maintaining the power assist functions, for example the power brakes, power steering and similar operating aids are controlled via the electric motor. To do this additional V-belt belt connections are necessary; this leads to a more complicated structure. Especially in the generic designs, specifically the assignment of the internal combustion engine to the front axle, while the electric motor is assigned to the rear axle, the two power plants, i.e. the internal combustion engine and electric motor, are separated in space from one another so far that maintaining power assist functions entails considerable construction expense.

The generic DE-A 30 09 503 suggests that a second electric motor be made available to maintain the power assist functions.

SUMMARY OF THE INVENTION

The object of the invention is to provide an improved hybrid vehicle which optimally uses the components which are employed.

To do this according to the invention it is provided that the second electric motor which is used to drive the additional units during electric propulsion is driven during operation by the internal combustion engine, however it is connected as a generator to charge the batteries.

Other objects and advantages of the present invention will become more apparent to those persons having ordinary skill in the art to which the present invention pertains from the following description taken in conjunction with the accompanying drawings.

DETAILED DESCRIPTION

Figure 1:
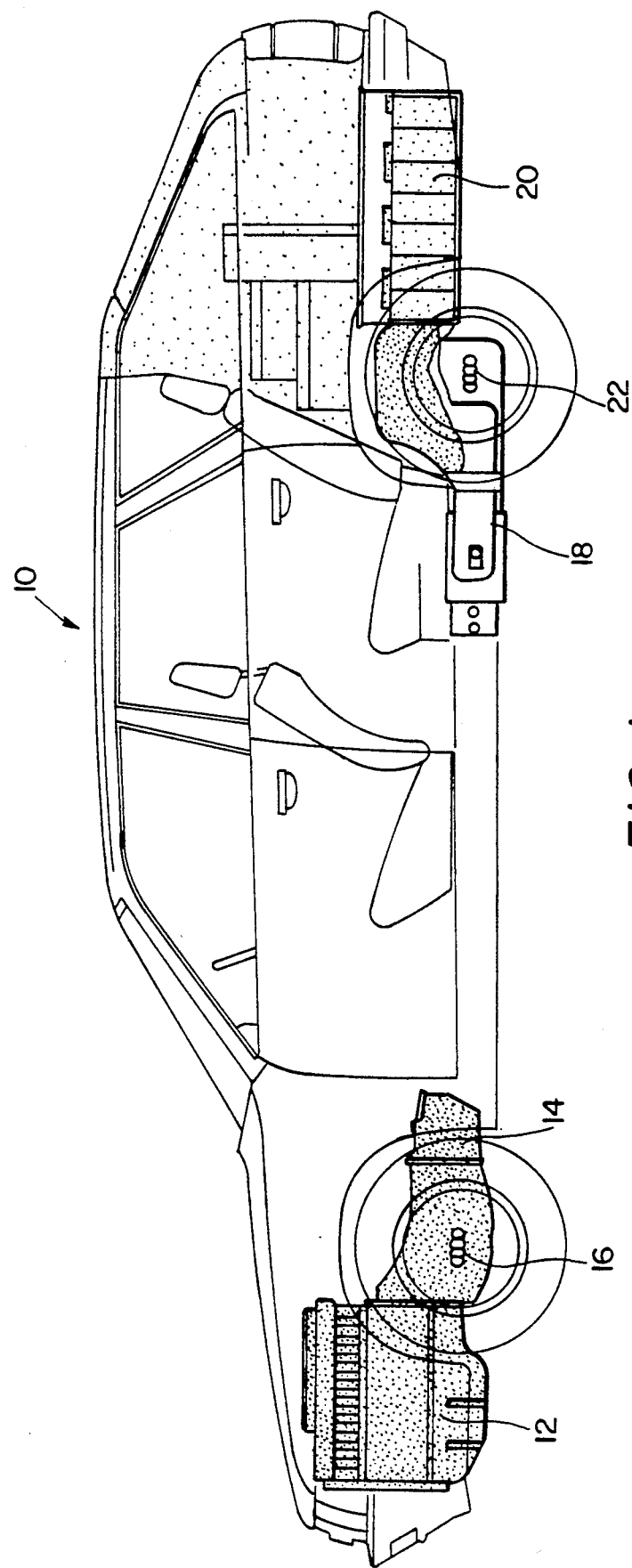
FIG. 1 shows a side view of the vehicle as per the invention.

FIG. 1 shows a side view of the hybrid vehicle 10 which has an internal combustion engine 12 with a transmission 14 flanged to it in the forward engine compartment. The engine-transmission unit 12 and 14 drives the front axle 16.

On the rear axle is an electric motor 18 which is supplied with power via its own set of batteries 20. The electric motor 18 drives the rear axle 22.

Figure 2:
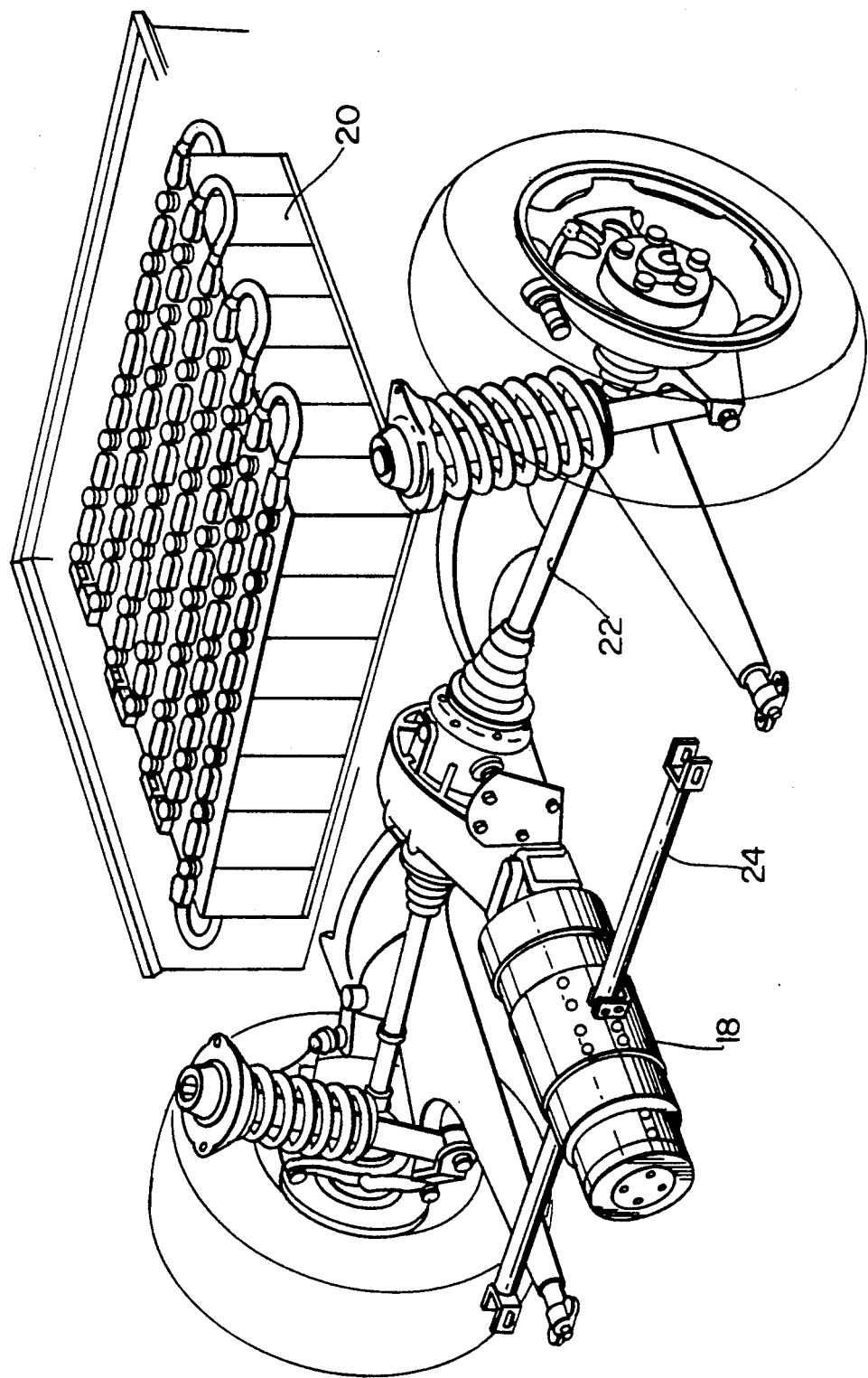
FIG. 2 shows a representation of the rear axle of the vehicle as per the invention.

The rear axle structure is shown in detail in FIG. 2. The electric motor 18, powered by batteries 20 drives the drive shafts 22 via a differential.

The corresponding mountings for the electric motor 18 are labelled 24; they suspend the electric motor 18 in a suitable manner on the frame so that it can accommodate the vibrations acting on the rear axle in the appropriate manner.

Figure 3:
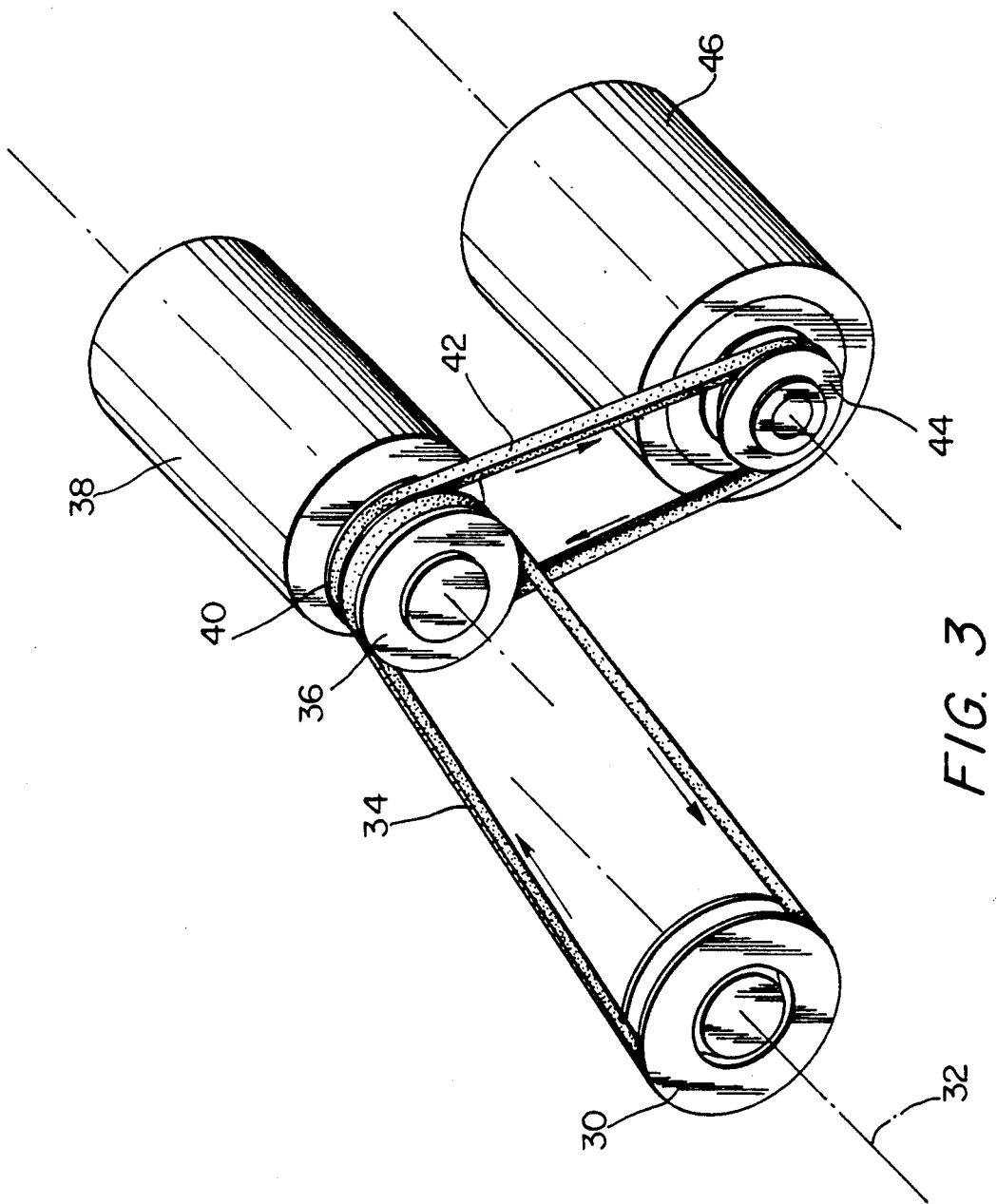
FIG. 3 shows the drive of the power steering pump for the vehicle as per the invention.

FIG. 3 shows the arrangement for driving the power steering pump.

A pulley 30 is driven by the crankshaft of the internal combustion engine; the center of the crankshaft is labelled 32. Rotation of the pulley 30 is transmitted via a V-belt 34 to a pulley 36 which sits on the axle of the power steering pump 38 and drives it. The pulley 36 has a free wheeling state so that the power transmission from the pulley 30 to pulley 36 drives the power steering pump 38, whereas transmission from pulley 36 to pulley 30 is not possible due to the free-wheeling state.

The drive shaft for the power steering pump 38 has another pulley 40 which is connected via a V-belt 42 to a pulley 44 of an electric motor 46.

When the hybrid vehicle 10 is now operated in electric motor drive mode, therefore with the internal combustion engine 12 shut off, the pulley 40 is driven via the electric motor 46 and V-belt 42 and thus the power steering pump 38 is driven to maintain operation of the power steering and power brakes.

In this case it is provided that also when the internal combustion engine is operating the motor 46 follows via V-belts 34 and 42, and only then is the electric motor 46 connected as a generator and used to recharge the batteries 20.

The batteries 20 can be preferably charged by dividing them into 12 volt cells which are connected in parallel and accordingly charged with a voltage of 12 volts.

When the electric motor 18 is driven via batteries 20 five of these cells are series connected to reach an operating voltage of 60 volts which are applied to electric motor 18.

Figure 4:
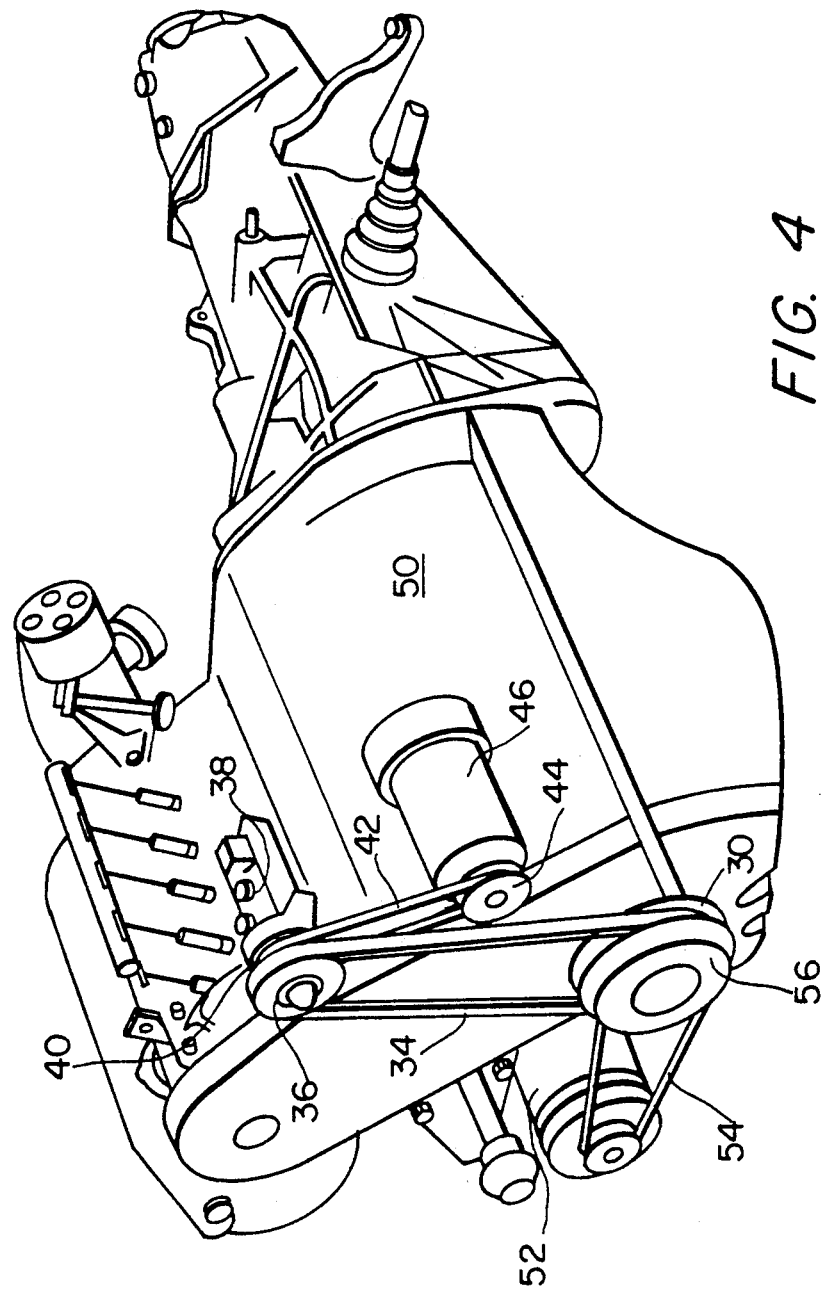
FIG. 4 shows a representation of the drive of the power steering pump in conjunction with the internal combustion engine.

FIG. 4 shows the power steering pump and servo motor/servo generator elements in correctly positioned installation in their attachment to the internal combustion engine. Reference symbol 50 designates an internal combustion engine with crankshaft which turns a first pulley 30 and second pulley 56. The pulley 56 is connected via a V-belt 54 to the conventional electric generator 52. The second pulley 30 turns, via a V-belt 34, the pulley 36 of the power steering pump 38; on the same axle sits a second pulley 40 of the power steering pump which is connected via V-belt 42 to the pulley 44 of the electric motor 46.

Figure 5A:
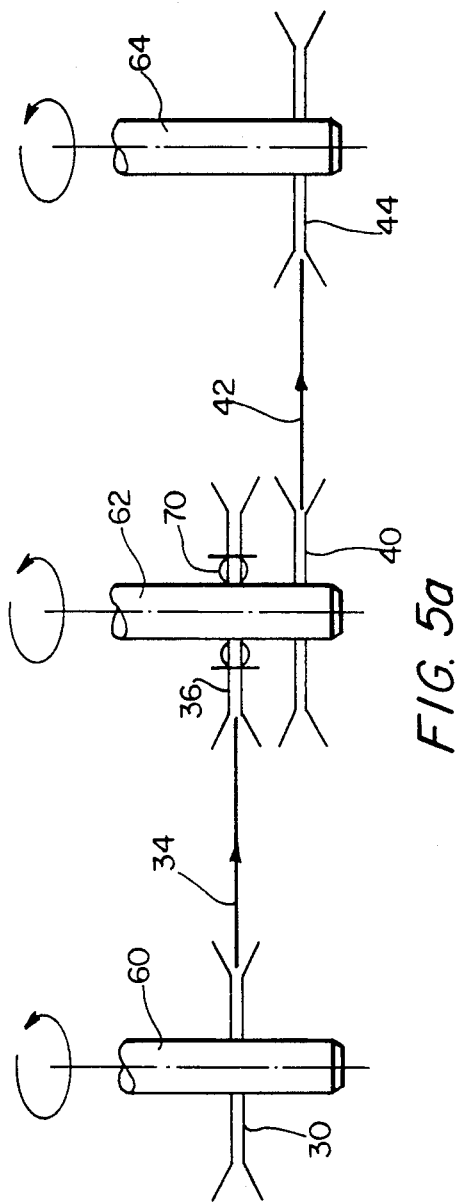
FIGS. 5a and 5b show in schematic form the connection between the crankshaft, power steering pump and servo motor.
Figure 5B:
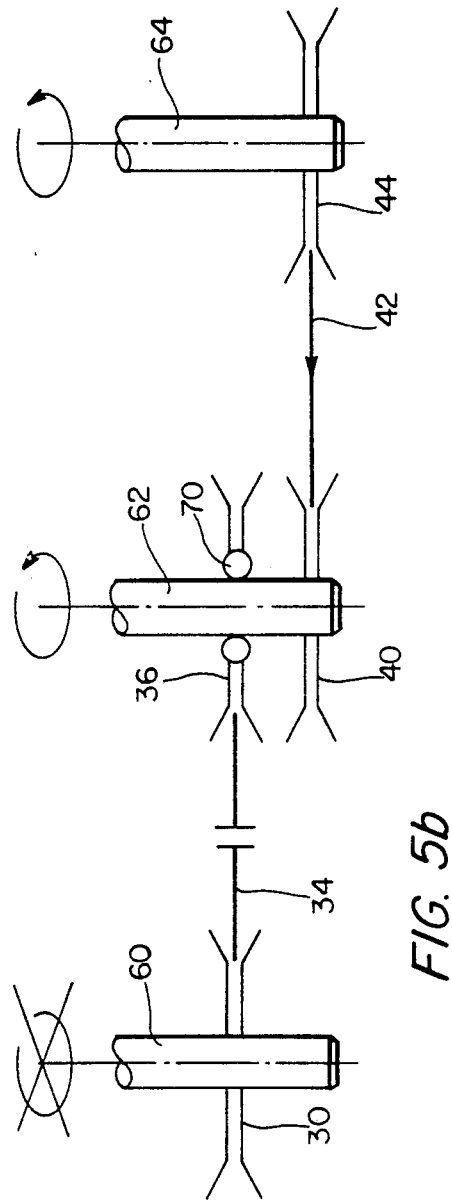

The pulleys and pertinent drive and driven shafts are again shown schematically in FIGS. 5a and 5b for explanatory purposes.

A free-wheel 70 which is assigned to the pulley 36 is shown blocked in FIG. 5a. This mode corresponds to operation with the internal combustion engine so that the shaft 60 assigned to the crankshaft, via the pulley 30 and V-belt 34, drives the pulley 36 which again turns the shaft 62 of the power steering pump with the free-wheel 70 blocked. The electric motor 46 is simultaneously connected as a generator so that the shaft 46 assigned to it is driven via the pulley 40 which is connected to the shaft 62, and the V-belt 42 and the pulley 44. Thus the servo motor/generator 46 is operated as a generator and generates power for recharging the battery unit 20.

In the operating mode according to FIG. 5b the free-wheel 70 is not blocked so that there is no connection between the pulley 36 and the shaft 62. The operating mode corresponds to electric drive, for which the servo motor 46, which at this point is operating as a motor and not as a generator, drives the pulley 40 via its pulley 44 and V-belt 42 so that the power steering pump is driven to maintain power assist functions.

We claim:

1. A vehicle comprising:
  a first axle for propelling the vehicle;
  a second axle for propelling the vehicle;
  an internal combustion engine for selectively driving the first axle;
  an electric propulsion motor for selectively driving the second axle when the internal combustion engine is not driving the first axle;
  a battery supply for powering the electric propulsion motor;
  at least one auxiliary power unit;
  an electric unit capable of acting as a motor and a generator, the electric unit acting as a motor for driving the at least one auxiliary power unit when the second axle is driven by the electric propulsion motor and acting as a generator powered by the internal combustion engine for recharging the battery supply when the first axle is driven by the internal combustion motor; and
  a single pulley mechanically connecting the electric unit to the auxiliary power unit.

2. A vehicle according to claim 1, wherein the auxiliary power unit comprises a pump, the vehicle further comprising a first V-belt driven by the internal combustion engine for operating the pump and a second V-belt driven by said electric unit for operating the pump.

3. A vehicle according to claim 2, wherein the pump includes a pulley for each of the first and second V-belts and at least one of the pulleys has a free-wheel.

* * * * *